US007941929B2

(12) United States Patent
Miklosz et al.

(10) Patent No.: US 7,941,929 B2

(45) Date of Patent: May 17, 2011

(54) CORDLESS CIRCULAR SAW

(75) Inventors: Mark Miklosz, Western Springs, IL (US); Matthew Rybka, Chicago, IL (US)

(73) Assignee: Robert Bosch Tool Corporation, Broadview, IL (US)

( * ) Notice: Subject to any disclaimer, the term of this patent is extended or adjusted under 35 U.S.C. 154(b) by 75 days.

(21) Appl. No.: 12/537,465

(22) Filed: Aug. 7, 2009

(65) Prior Publication Data

US 2009/0293291 A1 Dec. 3, 2009

Related U.S. Application Data

(63) Continuation of application No. 10/245,463, filed on Sep. 17, 2002, now Pat. No. 7,581,323.

(51) Int. Cl.
*B23D 45/16* (2006.01)

(52) U.S. Cl. ................................ 30/388; 30/389; 30/391

(58) Field of Classification Search .................... 30/376, 30/391, 388, 374, 389, 390; 320/114, 107, 320/117, 116, 112, 113; 307/93, 64, 44, 307/66, 107, 149, 150; 429/96, 97, 98, 99, 429/100

See application file for complete search history.

(56) References Cited

U.S. PATENT DOCUMENTS 2,737,985 A 3/1956 Utz
2,761,474 A 9/1956 Dolan
4,414,743 A 11/1983 Pioch et al.
4,516,324 A 5/1985 Heininger, Jr. et al.
4,555,849 A 12/1985 Ando et al.
4,589,208 A 5/1986 Iwasaki et al.
4,847,513 A 7/1989 Katz et al.
4,870,758 A 10/1989 Fushiya
5,159,870 A 11/1992 Fiala
5,287,786 A 2/1994 Fiala
5,570,511 A 11/1996 Reich et al.
5,653,033 A 8/1997 McDowell
5,878,607 A 3/1999 Nunes
5,902,080 A 5/1999 Kopras
D418,032 S 12/1999 Watson et al.
6,044,744 A 4/2000 Eslambolchi et al.
6,057,608 A 5/2000 Bailey, Jr. et al.
6,075,341 A 6/2000 White et al.
6,094,827 A 8/2000 Campbell
6,161,293 A 12/2000 Watson
6,304,058 B2 10/2001 Watson et al.
6,329,788 B1 12/2001 Bailey, Jr. et al.
D466,385 S 12/2002 Shigo et al.
D470,376 S 2/2003 Chunn et al.
D472,126 S 3/2003 Miklosz et al.
6,543,143 B2 4/2003 Moore et al.
(Continued)

FOREIGN PATENT DOCUMENTS

EP 0752240 1/1997
(Continued)

*Primary Examiner* — Boyer D. Ashley
*Assistant Examiner* — Omar Flores-Sánchez
(74) *Attorney, Agent, or Firm* — Greer, Burns & Crain, Ltd.

(57) ABSTRACT

A circular saw including a motor housing having a first end portion and a second end portion, a motor assembly disposed within the housing, a rotary blade assembly having a predetermined weight mounted to the first end portion of the motor housing, and a battery pack having a predetermined weight disposed on the second end portion of the motor housing. The battery pack and the rotary blade assembly are configured and arranged to be in longitudinal alignment with one another, and the longitudinal alignment of the battery pack with the rotary blade assembly promotes counterbalancing between the predetermined weight of the rotary blade assembly and the predetermined weight of the motor housing.

7 Claims, 8 Drawing Sheets

U.S. PATENT DOCUMENTS

| | | | |
|---|---|---|---|
| 6,625,891 | B2 | 9/2003 | Stielper |
| 2001/0029819 | A1 | 10/2001 | Okouchi |
| 2002/0166240 | A1 | 11/2002 | Duford et al. |
| 2003/0037445 | A1 | 2/2003 | Fey et al. |

FOREIGN PATENT DOCUMENTS

| | | |
|---|---|---|
| GB | 2331268 | 5/1999 |
| JP | 57-207001 | 12/1982 |
| JP | 59-140001 | 8/1984 |
| JP | 6-278102 | 6/1994 |

CORDLESS CIRCULAR SAW

PRIORITY CLAIM

This application is a continuation application of U.S. application Ser. No. 10/245,463, filed Sep. 17, 2002.

BACKGROUND OF THE INVENTION

The present invention generally relates to circular saws, and more particularly to cordless circular saws.

Circular saws are in widespread use for cutting materials such as wood. An example of such circular saws is those produced under the Skil brand by S-B Power Tool Corporation of Chicago, Ill. Cordless versions of the circular saws generally include a rotary blade assembly, a motorized drive unit disposed within a housing, a single handle disposed on the housing, and a battery pack affixed to a bottom end of the handle. However, because each of the circular saw components has a predetermined weight, the assembled circular saw may be somewhat heavy or cumbersome for the user. While efforts have been made to maximize ease of use of cordless circular saws, no effort has been made to align the cordless circular saw components in a manner that would optimize the overall balance of the circular saw. The conventional alignment fails to adequately account for imbalances resulting from the handle-mounted battery configuration or to provide unique handle configurations that confer better balance to the cordless circular saw.

SUMMARY OF THE INVENTION

The present invention is related to a particularly convenient cordless circular saw assembly that reduces or eliminates imbalances due to misalignment or disproportioned alignment of assembly components, and additionally provides handle means for enabling a user to position and guide the cordless circular saw assembly in a desired direction.

DETAILED DESCRIPTION OF THE INVENTION

Cordless circular saws typically include a blade assembly for engaging and cutting a work surface and a motor encased by a motor housing mounted to one side of the blade assembly. An arched handle assembly extends from and around a portion of the motor housing, wherein the handle assembly includes a first handle portion and a second handle portion, and these handle portions are typically in front to back alignment with one another. The motor housing extends beneath the handle assembly on either side of the handle assembly. Thus, a user grasping the tool with both hands grips the first handle portion with one hand and the second handle portion with the other hand, so that the hands are in vertical alignment with one another. A blade assembly is generally attached to a first end of the motor housing, and a battery pack is ordinarily attached at a distal end of the second handle portion. Typically, the three heaviest components of the conventional circular saw assembly are the battery pack, the blade assembly and the motor. Since these components are typically arranged as described, there is a pronounced lack of linearity or longitudinal balance of the conventional cordless circular saw assembly along the work surface.

Figure 1:
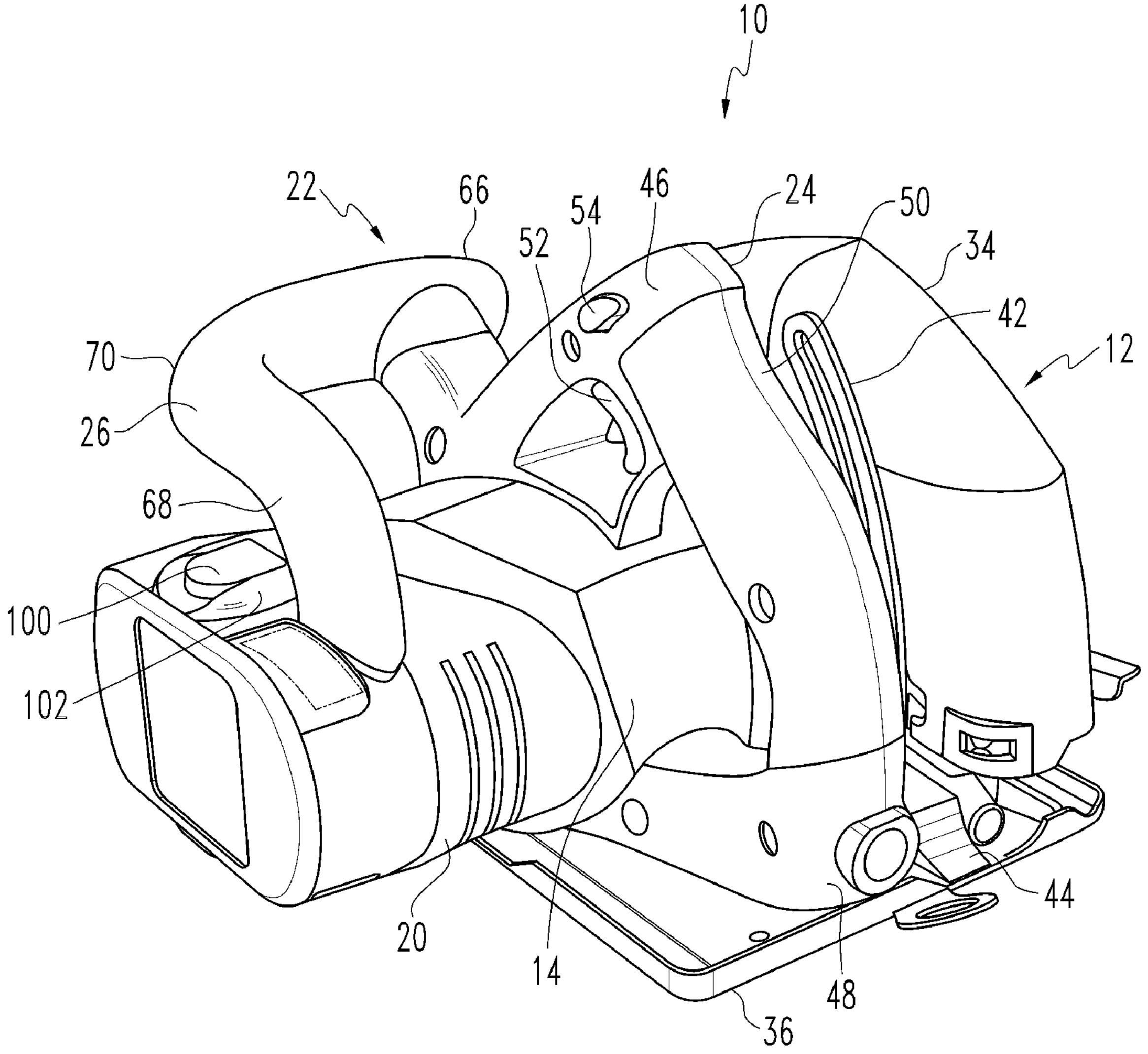
FIG. 1 is a front elevational view of the cordless circular saw of the instant invention.
Figure 2:
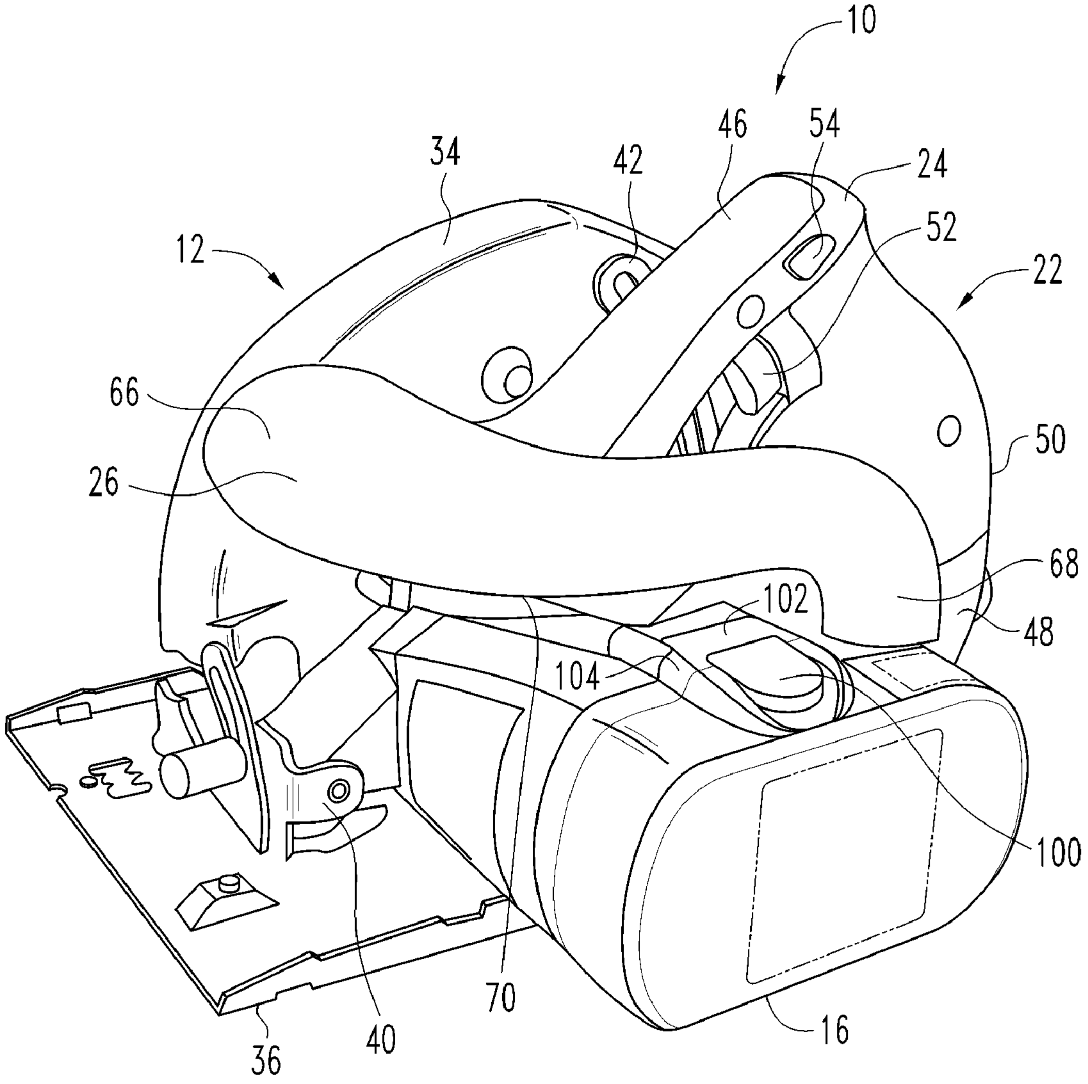
FIG. 2 is side elevational view of the cordless circular saw assembly illustrated in FIG. 1.
Figure 3:
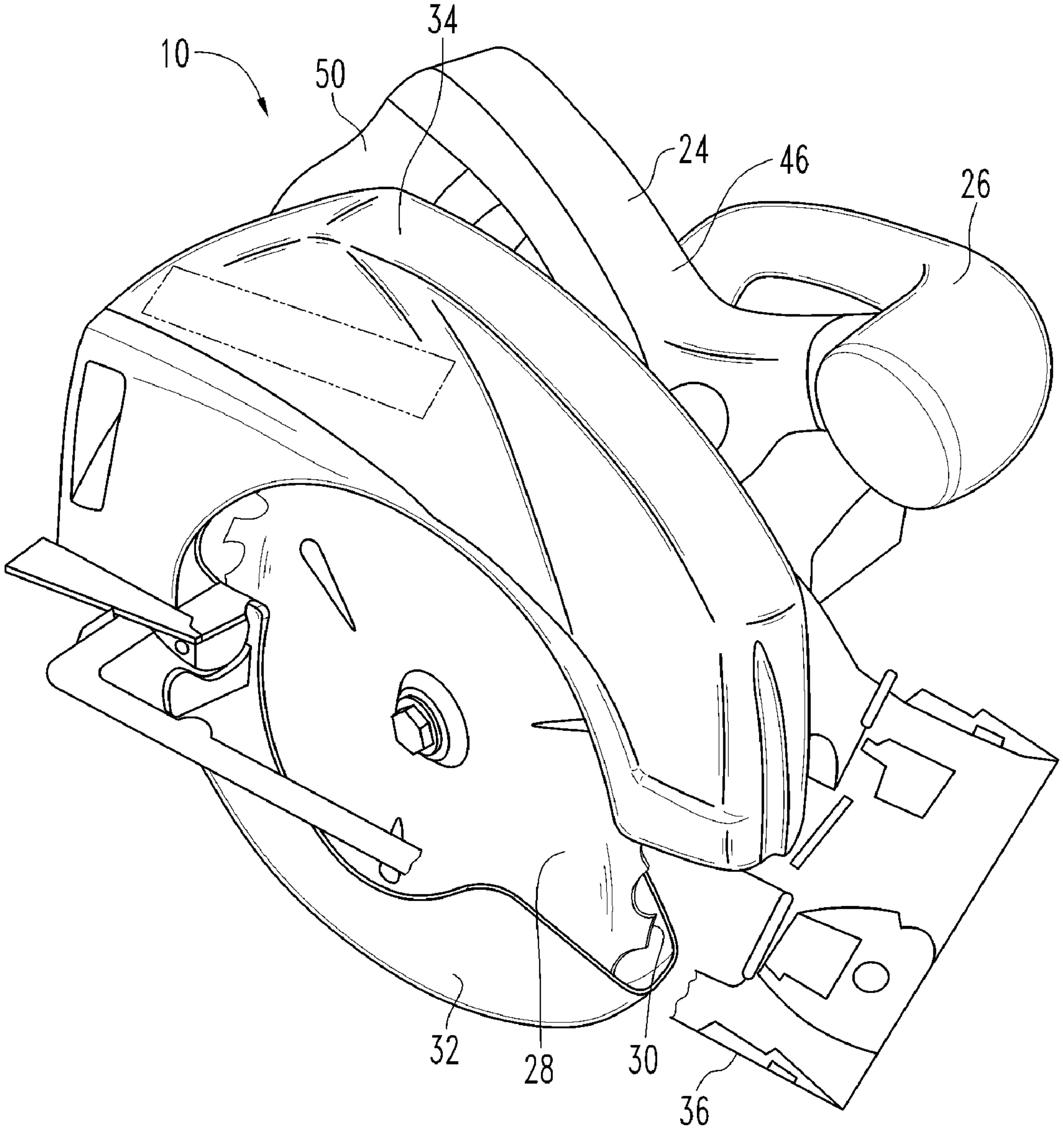
FIG. 3 is a side perspective view of the cordless circular saw assembly illustrated in FIG. 1.
Figure 4:
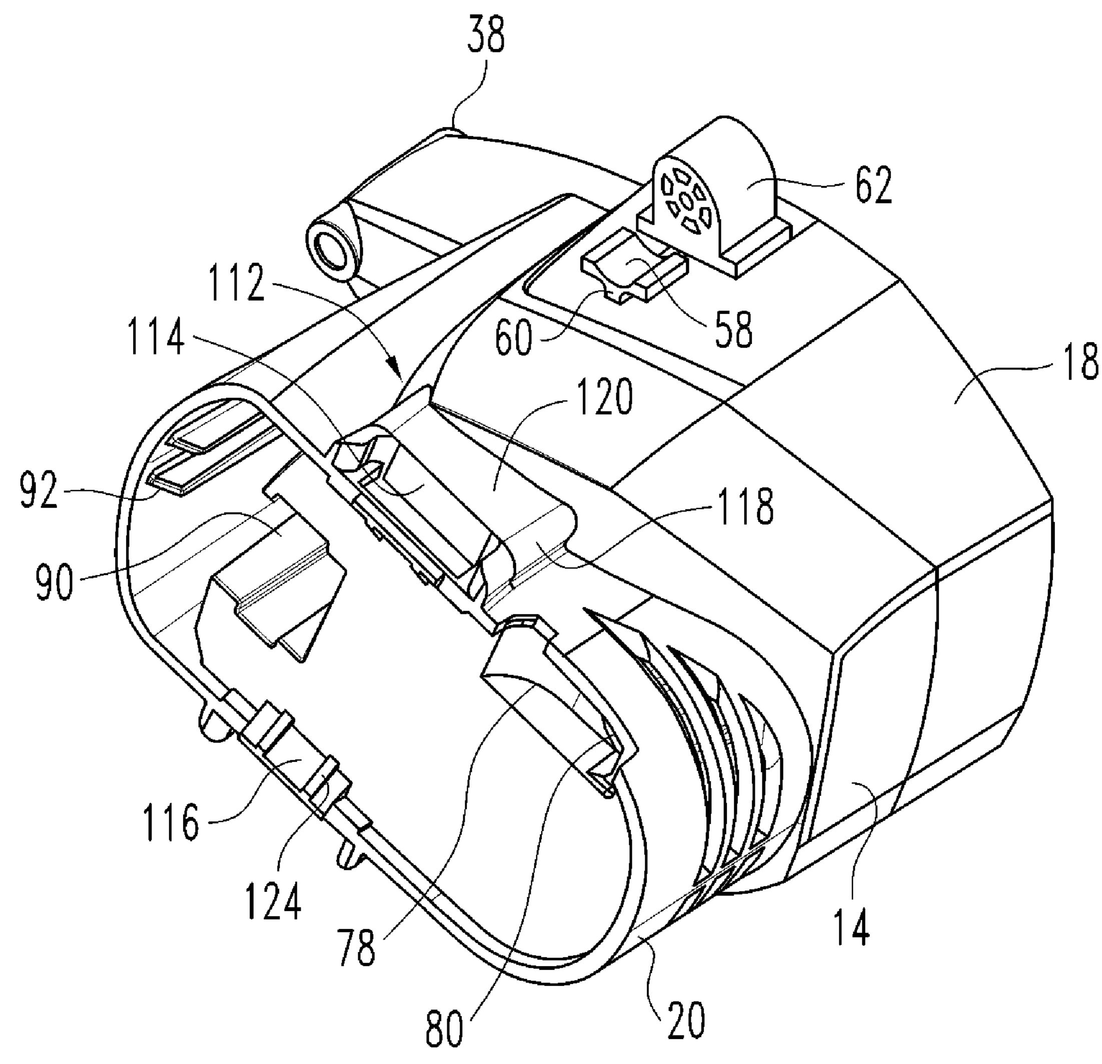
FIG. 4 is a side perspective view of the motor housing of the cordless circular saw assembly illustrated in FIG. 1.
Figure 5:
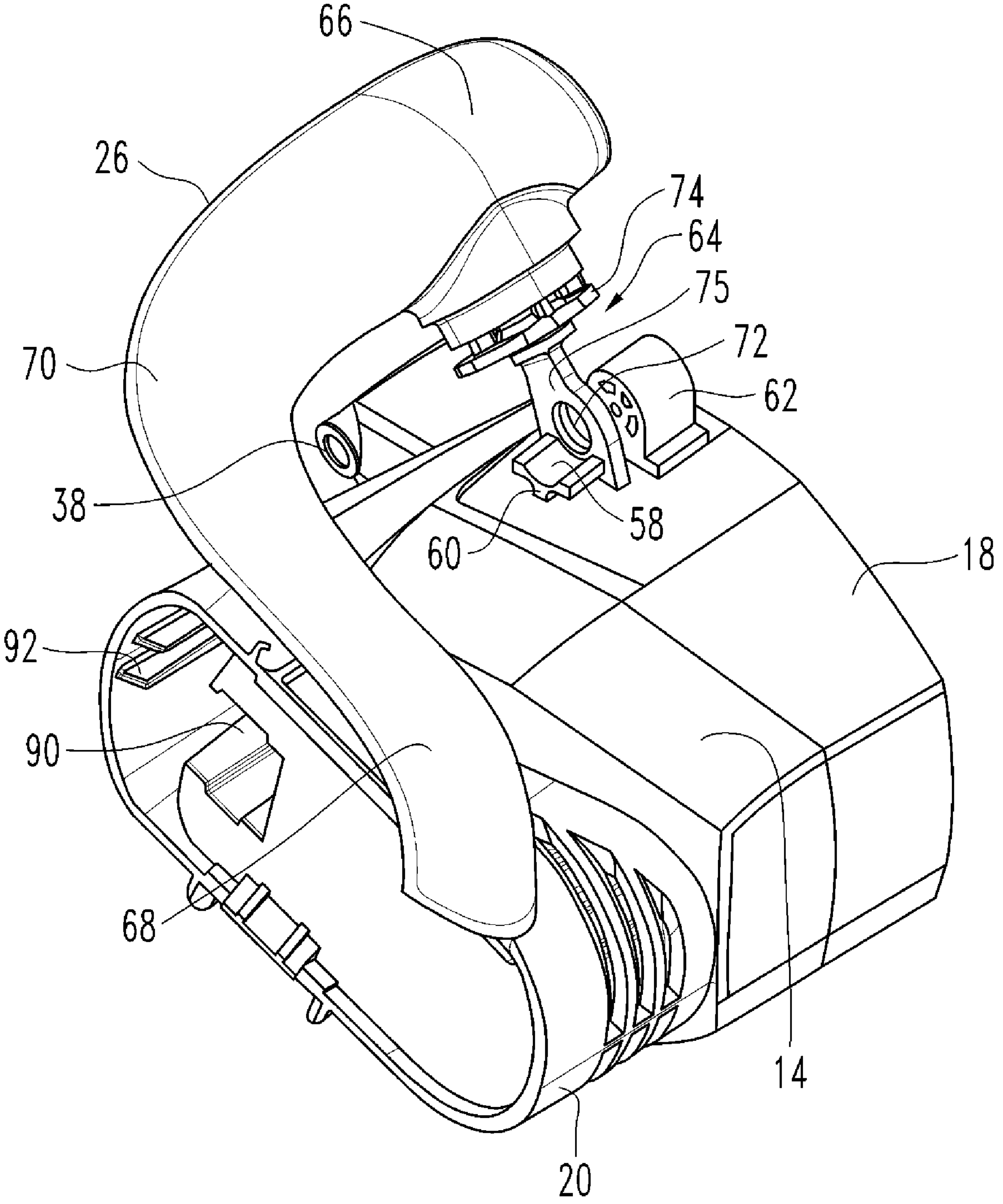
FIG. 5 is a side perspective view of the motor housing coupled to the second handle portion of the cordless circular saw assembly illustrated in FIG. 1.
Figure 6:
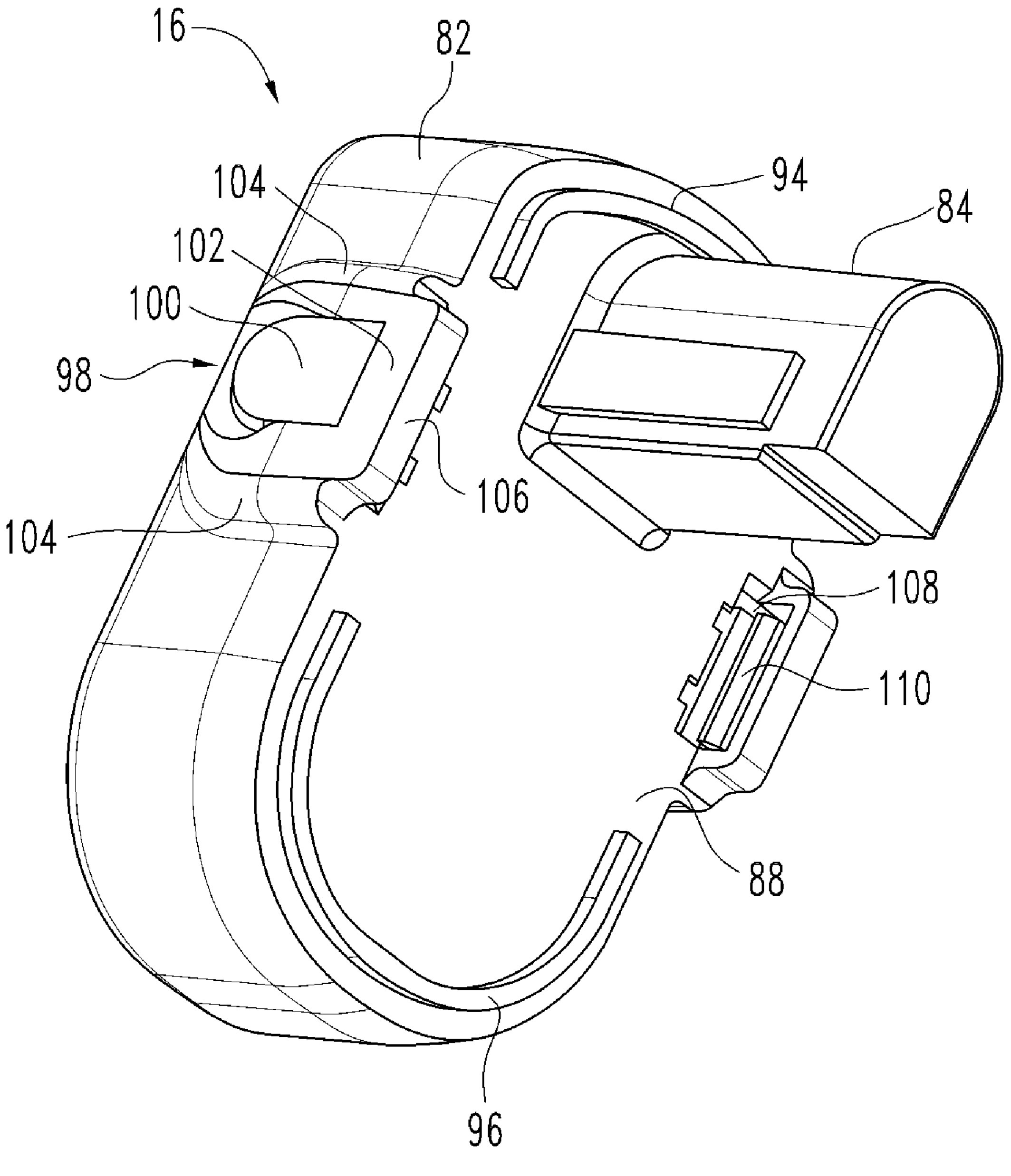
FIG. 6 is a front elevational view of the battery pack used with the cordless circular saw assembly illustrated in FIG. 1.
Figure 7:
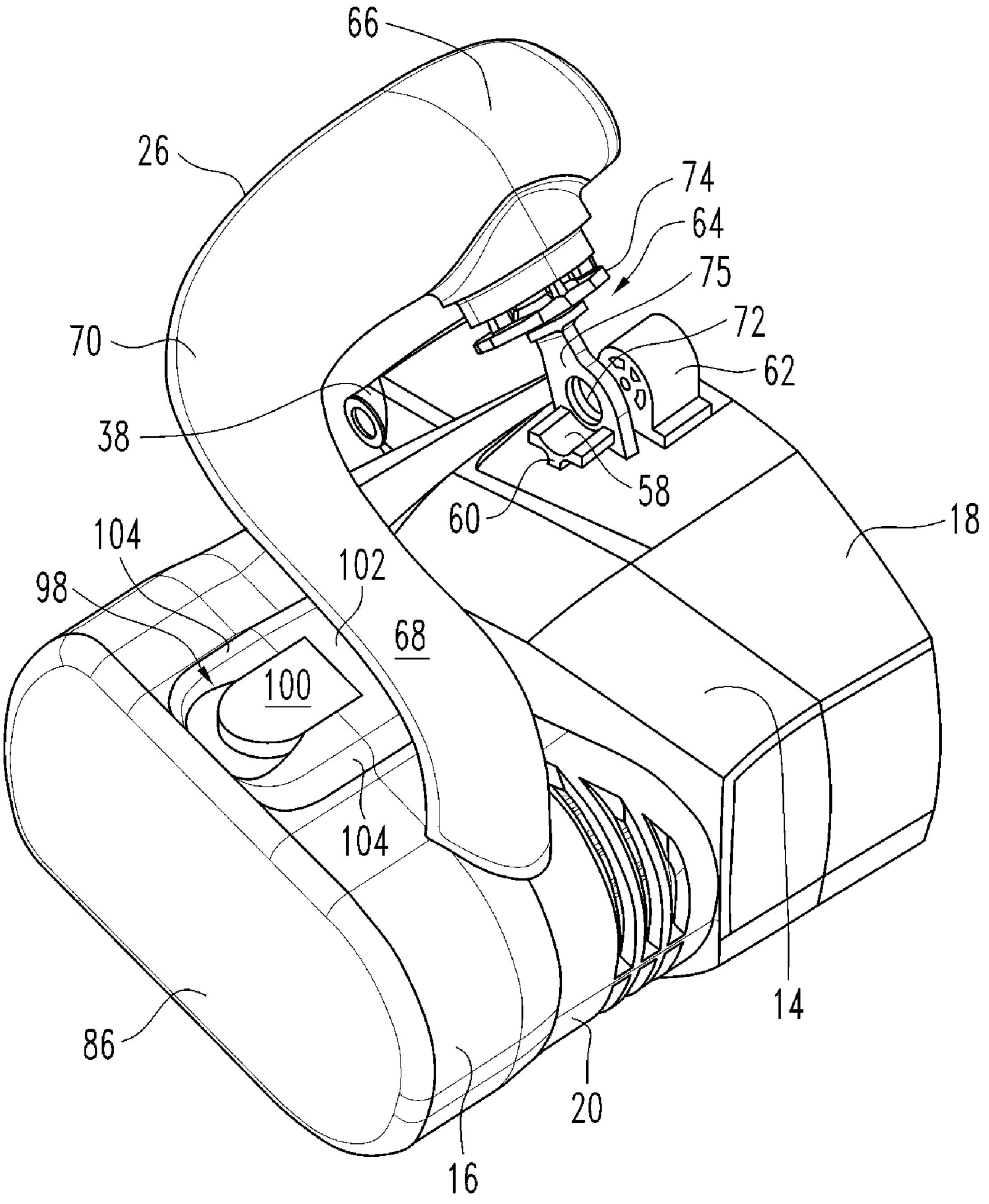
FIG. 7 is a side perspective view of the assembled battery pack, motor housing, and second handle portion of the cordless circular saw assembly illustrated in FIG. 1.
Figure 8:
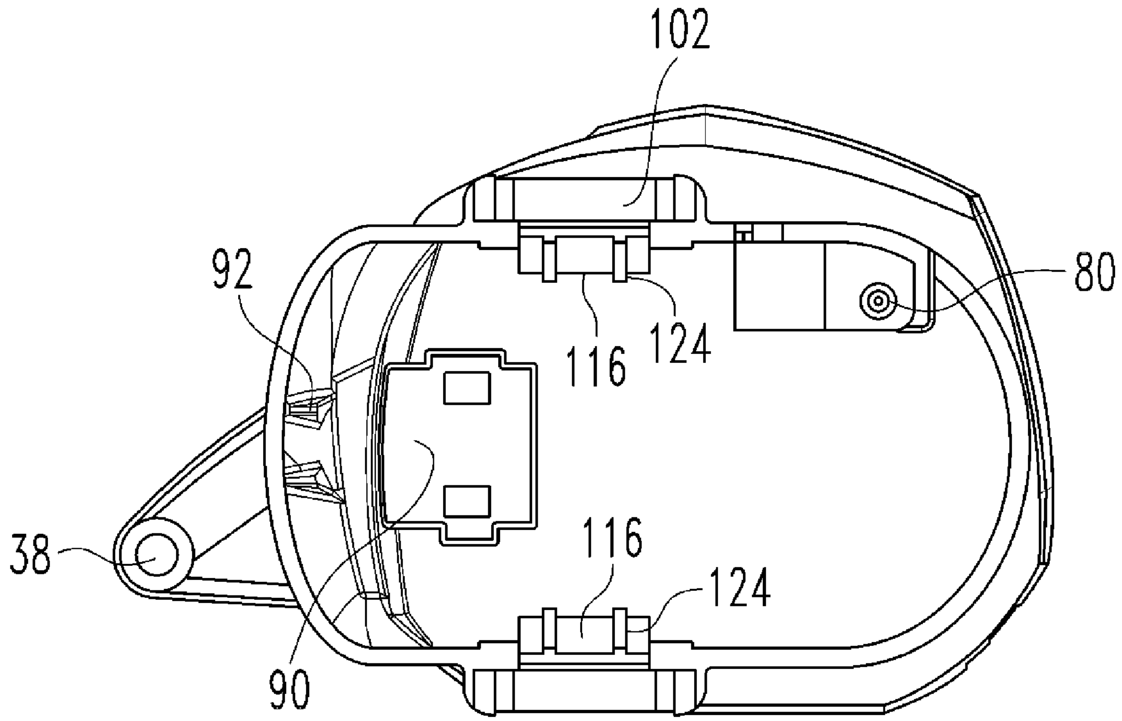
FIG. 8 is a side elevational view of the motor housing of the cordless circular saw assembly illustrated in FIG. 1.

Turning now to FIGS. 1-3, the cordless circular saw assembly of the instant invention, designated generally at 10, includes a blade assembly 12, a motor (not shown) encased in a motor housing 14, and a battery pack 16. As is typical of conventional circular saws, the blade assembly 12 is attached to a first end portion 18 of the motor housing 14. However, the instant cordless circular saw assembly 10 is configured and arranged so that the battery pack 16 or other auxiliary or modular power supply is removably secured to a second end portion 20 of the motor housing 14. In this way, the heaviest components of the instant saw assembly 10, the blade assembly 12 and the battery pack 16, are in longitudinal alignment with one another, conferring greater stability and balance to the cordless circular saw assembly 10. The longitudinal alignment of the blade assembly 12 with the battery pack 16 promotes a longitudinal counterbalancing of the respective predetermined weights of each. This is achieved because the housing is configured to have a predetermined length, so that a moment arm of the battery pack is substantially equal to a moment arm of the rotary blade assembly.

Moreover, a handle assembly provided with the instant invention, generally indicated at 22, is provided that allows a user to optimize the balance afforded by the alignment of the blade assembly 12 and the battery pack 16 by having a first handle portion 24 and a second handle portion 26 that provide for longitudinal as well as vertical displacement of the user's hands while operating the cordless circular saw assembly 10.

More particularly, the blade assembly 12 of the instant invention preferably includes a circular blade 28 (best shown in FIG. 3) having a predetermined diameter and cutting teeth 30 (best shown in FIG. 3) located radially about the periphery of the circular blade, a retractable arcuate lower blade guard 32 and a stationary arcuate upper blade guard 34. In the preferred embodiment of the invention, the circular blade 28 may be obtained from a standard commercial source, such as a blade produced by American Tool in Cambridge, Ontario.

The blade assembly 12 is mounted to the motor housing 14 in a conventional manner. When mounted to the motor housing 14, a rotational axis 29 of the circular blade 28 is parallel to a longitudinal axis of the motor housing. An output shaft (not shown) of the motor assembly protrudes through the second end portion 20 of the motor housing and matingly engages a central orifice at the hub of the circular blade 28. Intermediate the central orifice the output shaft engages a plurality of gears, for example three, that are configured and arranged within the upper blade guard 34 to gear down the revolutions per minute (rpm) of the output shaft. The output shaft also includes an annular flange and a threaded portion at its distal end, wherein the threaded portion matingly engages the central orifice, and the annular flange rests flush with a surface of the circular blade 28, thereby limiting the depth of protrusion of the output shaft. A locking nut (not shown) threadedly engages the threaded portion of the output shaft at an opposite side of the circular blade 28. The locking nut includes an annular flange portion, which abuts the surface of the circular blade at a side opposite the annular flange of the output shaft, and also includes a nut portion sized and configured to allow a user to attach and remove the locking nut using a conventional wrench or other tool means.

A majority of the circular blade 28 is housed within the arcuate lower and upper blade guards 32, 34, which in a closed position form a generally circular housing wherein the lower blade guard 32 houses a lower portion of the circular blade 28 and the upper blade guard 34 houses an upper portion of the circular blade 28. Generally, the upper blade guard 34 is stationary and removably secured to the first end portion 18 of the motor housing 14 via a plurality of threaded fasteners that extend through from upper blade guard to matingly engage threaded receptacles disposed on the motor housing. The lower blade guard 32 houses the lower portion of the circular blade 28 while the cordless circular saw assembly 10 is not in use, but must be removable to expose the circular blade when the user decides to operate the saw. Thus, the lower blade guard 32 is pivotably mounted to the upper blade guard 34 and is biased in the closed position by a spring force. Generally, the lower blade guard 32 is mounted to the upper blade guard 34 via a bearing plate (not shown) disposed within the upper blade guard that concentrically mount the lower blade guard so that the upper and lower blade guards rotate around the same axis. The lower blade guard 32 is configured and arranged on the circular blade 28 so that during operation, the user may place a front surface of the lower blade guard at a predetermined work surface urge the cordless circular saw assembly 10 forward, the spring force is overcome and the lower blade guard retracts about a circumference of the circular blade, into the upper blade guard 34. The lower and upper blade guards 32, 34 of the instant invention are preferably made from a lightweight material, such as cast aluminum. However, the instant invention contemplates use of a variety of materials sufficiently resilient to guard the circular blade 28 from inadvertent exposure to unintended surfaces.

The cordless circular saw assembly 10 of the instant invention includes a conventional base or foot plate foot 36 used to guide the assembly during use. The foot plate 36 is a generally planar, rectangular plate configured and arranged beneath the motor housing 14 and is attached to the motor housing via mating engagement between a cylindrical tube section 38 disposed an the motor housing 14 and a mating C-shaped clamp section 40 on the foot plate 36 clamps around the tube section 38. Insertion of a pin or other fastener within the tube section 38 maintains the tube section and clamp section 40 in locking engagement. The foot plate 36 includes an elongated opening for receiving the lower blade guard 32.

The foot plate 36 is also preferably attached to the upper blade guard 34 at an opposite side of the motor housing 14 in a manner such that the user may selectively adjust the depth of cut of the saw assembly 10. A bolt extending from the upper blade guard 34 in a direction generally parallel to the axis of rotation engages an arcuate elongated slot 42 extending from the foot plate 36 in a direction generally perpendicular to the plane of the foot plate. A nut or other fastener is threaded to the bolt to maintain the depth of cut position of the circular blade 28. By reciprocating the bolt along the elongated slot 42, the user may selective adjust the depth of cut. A locking foot 44 is also provided for locking the circular blade 28 in a predetermined position.

The motor housing 14 that is central between the blade assembly 12 and the battery pack 16 is preferably composed of plastic, such as Acrylonitrile Butadiene Styrene (ABS) or glass-filled nylon. It includes a generally a hollow, cylindrical body that is configured at the first end portion 18 to matingly engage the blade assembly 12 and configured at the second end portion 20 to matingly receive the battery pack 16. The longitudinal length of the motor housing 14 is predetermined, taking a number of variables into account.

First, the length of the motor housing 14 must be sufficient to house the motor assembly used in conjunction with the instant invention. Any variety of motor assemblies are contemplated for use with the instant invention, such as a can motor or an open frame motor. For purposes of illustration only, the instant invention will be shown and described in conjunction with a can motor, such as that manufactured by Johnson Electric of Shelton, Conn. In the preferred embodiment of the instant invention, the motor assembly is configured and arranged within the motor housing 14 so that its longitudinal axis is parallel with the longitudinal axis of the motor housing. Thus, the longest portion of the motor assembly lies generally parallel to the longitudinal length of the motor housing. Preferably, the motor assembly is disposed within the motor housing 14 so that a longitudinal center of the motor assembly generally corresponds to a longitudinal center of the motor housing. However, the circumference of the motor assembly does not generally consumes the entire internal diameter of the motor housing, leaving a predetermined volume of space within the motor housing 14.

The length of the motor housing 14 can also be configured to confer greater balance to the overall cordless circular saw assembly 10. The battery pack 16 mounted to the second end portion 20 of the motor housing 14 and the blade assembly 12 mounted to the first end portion 18 each have an inherent, predetermined mass, and these masses may be disparate from one another, tending to make one lateral half of the saw assembly 10 heavier than the other lateral half. Accordingly, the length of the motor housing 14 may optionally be adjusted to configure the entire circular saw assembly 10 so that its geometric center, or fulcrum, is configured so that the respective weights of the battery pack 16 and blade assembly 12 are more evenly distributed.

When acting in opposite directions, two unequal forces will bring about an equilibrium when the product of the magnitude of one force and its effort arm, or lever arm (the distance of its point of application from the fulcrum), is equal to the product of the magnitude of the other force and its effort arm, according to the following equation:

$(f_1)(d_1)=(f_2)(d_2)$, where $f_1$ is the force of the first object, $d_1$ is the distance of the first force from the fulcrum (effort arm), $f_2$ is the force of the second object, and $d_2$ is the distance of the second force from the fulcrum (effort arm).

The respective forces exerted by the battery pack 12 and the blade assembly 16 are the products of their respective masses and the force of gravity, which is their respective weights. Thus, when the weight of the battery pack 16 multiplied by the distance from the fulcrum is equal to the weight of the blade assembly 12 multiplied by the distance from the fulcrum, the circular saw assembly 10 will be most balanced. Since there is usually a weight differential between the battery pack 16 and blade assembly 12, the respective effort arms must vary inversely with one another to achieve balance of the circular saw assembly 10. In the preferred embodiment of the instant invention, the battery pack 16 is generally heavier than the blade assembly 12, and according to the above equation, greater balance is achieved when, measuring from a center of the motor housing 14, the length of the second end portion 20 of the motor housing exceeds that of the first end portion 18. While those skilled in the art will appreciate that exactly balancing the above equation will maximize balance of the overall circular saw assembly 10, the instant invention contemplates any adjustment to the respective lengths of the first and second end portions 18, 20 of the motor housing 14 that results in any placement of the fulcrum that tends to increase balance of the overall circular saw assembly 10. Furthermore, even if the present circular saw assembly 10 is configured so that the fulcrum is disposed at the center of the motor housing 14, irrespective of the weight discrepancy between the battery pack 16 and blade assembly 12, the instant invention still confers a greater degree of balance than prior art cordless circular saw assemblies, which fail to mount the battery pack 16 in longitudinal alignment with the blade assembly 12.

The cordless circular saw assembly 10 of the instant invention is also provided with the handle assembly 22 for manually guiding the saw assembly. In the preferred embodiment of the instant invention, the handle assembly 22 includes the first handle portion 24 and the second handle portion 26, which are generally configured to be at right angles to one another. The first handle portion 24 is generally U-shaped and is fixedly secured to the motor housing 14 at upper and lower end portions 46, 48 that extend generally at right angles from a gripping portion 50. When secured to the motor housing 14, the upper and lower end portions 46, 48 extend radially outward from the surface of the motor housing, with the gripping portion 50 extends between the distal ends thereof. While the instant invention contemplates numerous materials out of which to make the first handle portion 24, in the preferred embodiment, the first handle portion is made of ABS or glass-filled nylon. The first handle portion 24 may also optionally have a layer of rubber or other grip-enhancing material attached to an outer portion thereof. In the preferred embodiment of the instant invention, the first handle portion 24 includes first and second longitudinal halves that matingly engage one another in a clam-shell configuration, and are secured to one another by a snap fit or other conventional fit. However, the first handle portion 24 of the instant invention is not limited to this clam-shell configuration, and can be configured as a single unitary piece as well. The gripping portion 50 of the first handle portion 24 may also optionally include a trigger button 52 or other actuator means for allowing the user to quickly supply or cut-off power to the cordless circular saw assembly 10 without removing the user's hands from the handle. Preferably, the trigger button 52 is disposed on an underside of the gripping portion 50, proximate to an ordinary location of the user's fingers when the user is gripping the first handle portion 24. As a further optional feature of the preferred embodiment, the first handle portion 24 may include one or more safety buttons 54 on one or either side of the first handle portion. To actuate the trigger button 52, either one or both of the safety buttons must be depressed. This optional safety feature prevents inadvertent depression of the trigger button 52 when the user is not prepared or not desirous of powering the cordless circular saw assembly 10.

The surface of the motor housing 14 to which the upper end portion 46 of the first handle portion 24 includes a locking portion 56, which includes a longitudinal slide lock 58 having a concave upper surface and a longitudinal arm 60 connecting its lower surface to the motor housing. The locking portion 56 also includes a cylindrical alignment portion 62. The first handle portion 24 includes a recess in an underside of its upper end portion 46 that matingly receives the locking portion 56.

The second handle portion 26 is a curved structure, and includes an attachment portion 64, a horizontal portion 66, a vertical portion 68, and a curved transition portion 70. The attachment portion 64 is configured to engage the locking portion 56 of the motor housing 14 and to extend radially therefrom. More specifically, the attachment portion 64 preferably includes a slot configured and arranged for matingly engaging the slide lock 58 of the locking portion 56. The slot has an opening at its underside, and is guided onto the slide lock 58 by the longitudinal arm 60, which engages the opening in the slot. An engagement orifice 72 is disposed above the slot, so that an arcuate underside of the circle creates a convex protrusion to matingly engage the concave upper surface of the slide lock 58. In this manner, the second handle portion 26 is mechanically coupled to the motor housing 14.

However, to prevent disengagement of both the first and second handle portions 24, 26 to the motor housing 14, the instant invention further provides for fixedly securing the handle portions to the motor housing. Once the second handle portion 26 is coupled to the motor housing 14, the two longitudinal halves of the first handle portion 24 are snapped together, encasing the attachment portion 64 of the second handle portion 26. To facilitate better engagement of the first handle portion 24 and the attachment portion 64 of the second handle portion 26, an internal circumference of the first handle portion is provided with an annular locking flange, and an annular locking shelf 74 is disposed on the attachment portion. When the longitudinal halves of the first handle portion 24 are pressed together, the annular locking flange and the annular locking shelf 74 matingly engage one another to secure the first and second handle portions 24, 26 together. Further, the upper end portion 46 of the first handle portion 24 is preferably provided with a downwardly depending engagement portion (not shown) having a locking orifice (not shown) that, when assembled with the second handle portion 26, aligns with the engagement orifice 72 on the attachment portion 64 of the second handle portion. The locking orifice is preferably threaded, and is configured to receive a threaded fastener that threadedly engages both the engagement orifice 72 and the locking orifice, releasably securing the first and second handle portions 24, 26 to one another. In turn, the entire handle assembly 22 is secured to the motor housing 14 by way of the mechanical coupling of the second handle portion 26 to the locking portion 56 of the motor housing.

The horizontal portion 66 of the second handle portion 26 extends at in a generally perpendicular direction to the attachment portion 64, and in a direction generally perpendicular to the gripping portion 50 of the first handle portion 24. It is sized and configured to fit ergonomically within the user's grip. The horizontal portion 66 is unitary with the vertical portion 68, and are separated by the transition portion 70, which is a generally elbow shaped portion. As with the horizontal portion 66, the vertical portion 68 is sized and configured to fit ergonomically in the user's grip. At its terminal end, the vertical portion 68 connects the second handle portion 26 to the second end portion 20 of the motor housing 14. A depression 78 in the second end portion of the motor housing 14 is configured and arranged to matingly receive the terminal end of the vertical portion 68 of the second handle portion 26. The depression 78 is generally planar, and when the terminal end of the vertical portion 68 is placed within the depression, a planar surface of the terminal end of the vertical portion abuts a bottom surface of the depression. A threaded orifice 80 is disposed on a side wall of the depression 78, which matingly engages a threaded boss on the terminal end of the vertical portion 68. Once the threaded orifice 80 and boss are matingly engaged, a threaded fastener is threaded through the threaded orifice and boss so as to maintain locking engagement between the two. In this way, the vertical portion 68 is lockingly engaged to the motor housing 14. An outer edge of the bottom surface of the depression 78 aligns with the circumferential edge of the second end portion 20 of the motor housing 14, so that when the battery pack 16 is subsequently assembled to the motor housing, the battery pack abuts the terminal end of the vertical portion 68.

Thus, during operation of the instant cordless circular saw assembly 10, a user generally grips the gripping portion 50 of the first handle portion 24 with the user's right hand. Preferably, the user is able to supply or remove power to the cordless circular saw assembly 10 via the trigger button 52 disposed at the underside of the gripping portion 50. To afford better leverage, balance and stability during use, the user's left hand may optionally grasp any portion of the second handle portion 26, which is configured to allow the user to position the left hand in a multitude of stations along the second handle portion 26. The horizontal portion 66 may be grasped to urge the saw assembly forward, or the vertical portion 68 may be grasped to better balance the saw assembly 10. The instant invention contemplates use of the second handle portion 26 of the handle assembly 22 for numerous reasons, including simple preference of the user.

Turning now to the battery pack 16 used in conjunction with the instant invention, any number of conventional commercial battery packs are contemplated for use with the instant invention. In the preferred embodiment of the instant cordless circular saw assembly 10, an 18-volt power tool battery manufactured by Skil of Chicago, Ill. is used. This type of battery typically includes a main power pack 82 and a stem connector 84 for establishing and maintaining electrical coupling with the saw assembly 10. However, the instant invention also contemplates using other kinds of commercial batteries such as "slide packs," which typically include a main power pack having guide rails for matingly engaging guide slots on a housing.

For purposes of description and illustration, the 18-volt battery having the main power pack 82 and the stem connector 84 will be shown and described. The power pack 82 includes a generally cylindrical housing that is sized and configured to have an outer circumference similar to that of the motor housing 14 so that when coupled, the transition between the outer surface of the battery pack 16 and the outer surface of the motor housing is generally even. The power pack 82 includes a first side 86 and a second side 88, where the first side defines an outermost edge of the assembled saw assembly 10, and the second side is opposite the first side. The stem connector 84 extends from an upper section of the second side 88 of the power pack 82 in a direction generally perpendicular to the plane of the second side. The length of the stem connector 84 is predetermined according to the depth of penetration required within the motor housing 14 to achieve electrical coupling. The motor housing 14 includes a female coupling recess 90 having a female battery terminal at its distal end. To achieve electrical coupling, the stem connector 84 includes a male battery terminal connector at its distal end for making electrical connection with the female battery terminal within the motor housing 14. In order to maintain proper alignment of the stem connector 84 within the motor housing 14, a top, internal portion of the motor housing includes two longitudinal guide ribs 92 that abut a curved top surface of the stem connector as the battery pack is inserted into the motor housing.

The second side 88 of the power pack 82 also includes upper and lower guide portions 94, 96, which are generally U-shaped flanges. The upper and lower guide portions 94, 96 are sized and configured so that the external walls thereof generally correspond to the internal circumference of the motor housing 14, and so that when assembled, the upper and lower guide portions abut the inner circumference of the motor housing.

Around the circumference of the power pack 82 are at least one and preferably two locking switches 98, which are configured to oppose one another along the circumference of the power pack and extend from the first side 86 of the power pack to the second side 88 of the power pack. The locking switches 98 include a generally rectangular locking lever 100 having a generally planar top surface that is surrounded by a raised portion 102 of the power pack 82. The raised portion 102 is separated from the circumferential surface of the power pack 82 by curved shoulder portions 104, and are unitary with the surface of the power pack. A front edge portion 106 of the raised portion 102 extends in a direction generally perpendicular to the plane of the locking lever 100, and forms a shelf-like projection from the front of the locking switches 98. A recessed underside of the locking switches 98 includes a cavity 108 that houses a hook latch end 110 of the locking lever 100. The depth of the cavity 108 generally corresponds to the height of the shoulder portions 104 from the circumferential surface of the power pack 82.

The locking levers 100 are spring biased in the closed position so that when the battery pack 16 is not assembled to the motor housing 14, the plane of the top surface of the locking lever is coplanar with the raised portion 102 of the power pack housing with the hook latch end 110 extending from an underside of the locking lever toward the plane of the second side 88 of the power pack 82. The front edge portion 106 of the locking switches 98 extends in a direction generally parallel to the plane of the second side 88 of the power pack 82. However, the application of force on a rear portion of the locking lever 100 retracts the hook latch end 110 of the locking lever away from the second side 88 of the power pack 82. The amount of force necessary to overcome the spring bias of the locking switches 98 in the closed position is predetermined, and is preferably no greater than that exerted by the average user pressing a thumb or finger firmly upon the locking switches.

To accommodate the locking switches 98, the motor housing 14 also includes at least one and preferably two opposing engagement portions 112 around a circumference thereof that matingly engage the locking switches 98 of the battery pack 16. Each engagement portion 112 includes a slot member 114 for receiving the locking switches 98 and a locking recess 116 for releasably securing the locking lever 100. The slot members 114 include two shoulder portions 118, a front wall 120 and a bottom wall 122, and are configured and arranged around the circumference of the motor housing 14 to nestingly engage the locking switches 98. A side of the engagement portion 112 abutting the motor housing 14 includes the locking recess 116, which has a generally triangular cross section and extends onto the surface of the second side 88 of the power pack 82. The locking recess 116 may further optionally be provided with reinforcement ribs 124 to confer additional strength and stability to the constituent material. To assemble the battery pack 16 to the motor housing 14, a user depresses the rear portion of the locking levers 100 to retract the hook latch end 110 so that the locking lever is in an open position. The locking switches 98 enter the slot member 114 with the front edge portion 106 leading until the front edge portion abuts the bottom wall 122 of the engagement portion 112. The locking lever 100, which is in the open position, slides over the locking recess 116. When the user releases the locking lever 100, the locking lever returns to the closed position, and the hook latch end 110 lockingly engages the locking recess 116. Thus, when the battery pack 16 is coupled to the motor housing 14, the locking switches 98 and the engagement portions 112 are coupled in a releasable locking engagement.

While a particular embodiment of the present cordless circular saw assembly has been described herein, it will be appreciated by those skilled in the art that changes and modifications may be made thereto without departing from the invention in its broader aspects and as set forth in the following claims.

What is claimed is:

1. A circular saw comprising:

a motor housing having a first end portion and a second end portion in a direction parallel to an axis of rotation of a circular blade, the outer end of said second end portion having a recess configured to receive a removable battery pack in locking engagement;

a motor assembly disposed within said housing;

a handle assembly extending from said motor housing, said handle assembly having a gripping portion that is generally centered between said first and second housing end portions;

a rotary blade assembly including a circular blade having said axis of rotation, said blade assembly having a first predetermined weight and being disposed at said first end portion of said motor housing, said first predetermined weight multiplied by the distance from said blade assembly to said gripping portion defining a first moment arm;

a battery pack having a second predetermined weight and being configured to be placed in said recess of said second end portion of said housing, said second predetermined weight multiplied by the distance from said battery pack to said gripping portion of a handle assembly defining a second moment arm; and said first moment arm is generally equal to said second moment arm.

2. The circular saw of claim 1 wherein said outer end of said second end portion of said motor housing includes a generally planar surface that is generally perpendicular to said axis of rotation of said rotary blade assembly.

3. The circular saw of claim 1 wherein said battery pack includes at least one locking switch for locking said battery pack in said recess of said motor housing.

4. The circular saw of claim 3 wherein said motor housing includes at least one engagement portion for matingly receiving said at least one locking switch for locking said battery pack in said recess of said motor housing.

5. The circular saw of claim 1 wherein said gripping portion of said handle assembly includes a trigger switch.

6. A circular saw comprising:

a motor housing having a first end portion and a second end portion and a predetermined length from said first end portion to said second end portion in a direction generally parallel to an axis of rotation of a blade, the outer end of said second end portion having a recess configured to receive a removable battery pack in locking engagement;

a motor assembly disposed within said housing;

a handle assembly extending from said motor housing, said handle assembly having a gripping portion that is generally centered between said first and second housing end portions in a direction parallel to said axis of rotation, a rotary blade assembly including a circular blade with said axis of rotation, said assembly having a first predetermined weight and being disposed at said first end portion of said motor housing, said first predetermined weight multiplied by the distance from said assembly to said gripping portion defining a first moment arm;

a battery pack having a second predetermined weight, and being configured to be placed in said recess of said second end portion of said housing, said second predetermined weight multiplied by the distance from said battery pack to said gripping portion defining a second moment arm;

said first moment arm is generally equal to said second moment arm to thereby balance said saw about said gripping portion.

7. The circular saw as defined in claim 6 wherein said gripping portion is vertically oriented when viewed from the rear of the saw.

* * * * *